United States Patent
Chuang

(12) 
(10) Patent No.: US 6,722,242 B2
(45) Date of Patent: Apr. 20, 2004

(54) TRANSMISSION DEVICE OF A TABLE SAW

(76) Inventor: Bor Yann Chuang, No. 78, Yungfeng Rd., Taiping Shiang, Taichung (TW), 411

( * ) Notice: Subject to any disclaimer, the term of this patent is extended or adjusted under 35 U.S.C. 154(b) by 167 days.

(21) Appl. No.: 10/004,404

(22) Filed: Dec. 5, 2001

(65) Prior Publication Data

US 2003/0101857 A1 Jun. 5, 2003

(51) Int. Cl.[7] .............................. B23D 45/06; B27B 5/20
(52) U.S. Cl. ........................ 83/471.3; 83/473; 83/477.1; 83/477.2; 83/581
(58) Field of Search ............................ 83/477.2, 471.3, 83/473, 581, 490, 491, 486.1, 477.1

(56) References Cited

U.S. PATENT DOCUMENTS

| | | | | | |
|---|---|---|---|---|---|
| 319,395 | A | * | 6/1885 | Doane | 83/477.1 |
| 1,566,838 | A | * | 12/1925 | Marois | 83/435.26 |
| 2,299,262 | A | * | 10/1942 | Uremovich | 83/473 |
| 2,320,743 | A | * | 6/1943 | Nilsen | 83/397 |
| 2,505,958 | A | * | 5/1950 | Grierson | 83/471.2 |
| 2,626,639 | A | * | 1/1953 | Hess | 83/473 |
| 2,661,777 | A | * | 12/1953 | Hitchcock | 83/473 |
| 2,784,750 | A | * | 3/1957 | Thomas | 83/471.3 |
| 3,011,529 | A | * | 12/1961 | Copp | 83/473 |
| 4,365,530 | A | * | 12/1982 | Johnson et al. | 83/490 |
| 5,819,625 | A | * | 10/1998 | Sberveglieri | 83/471.3 |
| 5,943,932 | A | * | 8/1999 | Sberveglieri | 83/471.3 |

* cited by examiner

Primary Examiner—Boyer D. Ashley
(74) Attorney, Agent, or Firm—Troxell Law Office PLLC

(57) ABSTRACT

A transmission device of a table saw includes a motor and an elevating member provided on a base. A first belt is connected around the belt pulley on the front end of the motor and around a transfer member, and a second belt connected around the transfer member and around the belt pulley of a circular saw blade. The first and the second belts are activated to rotate and carry on transmission at fixed positions so as to improve the defect of a conventional device that the belt may become loose or over tight when the saw blade of the table sawing machine is moving up or down.

2 Claims, 5 Drawing Sheets

TRANSMISSION DEVICE OF A TABLE SAW

BACKGROUND OF THE INVENTION

This invention relates to a table saw, particularly to one having a transmission device capable to maintain a fixed tension when the saw blade is moved up or down.

A conventional transmission device of a table saw, as shown in FIGS. 1 and 2, includes a rotatable circular saw blade 11 provided in the center of a table 10 for cutting off wood materials passing therethrough. The circular saw blade 11 is directly driven to rotate by a motor 12 fixed in a box, transmitted by a belt 13. The circular saw blade 11 must have a function of moving up and down to adapt to wood materials of different thickness. To elevate the circular saw blade 11, only turn around a hand-swinging rod 14 to let its worm 15 at a front end to activate the gear 17 under an elevating plate 16 to move, and, as the circular saw blade 11 is pivoted with the eccentric shaft hole 18 provided on an upper side of the elevating plate 16, the shaft hole 18 of the circular saw blade 11 will move in a curved direction to form different heights when the elevating plate 16 is rotating.

However, if the circular saw blade 11 arcuately moves upwards, the distance between the shaft hole 18 and the motor 12 becomes relatively long and the belt 13 is tightened. On the contrary, in case the circular saw blade 11 arcuately moves downwards, the distance between them is comparatively short and the belt 13 will become too loose to carry on transmission. Under such a condition, a spring 19 has to be additionally provided beside the motor 12 for to helping push the whole motor 12 outwards so as to permit the belt 13 to have enough tension to carry on transmission. Besides, the tension of the belt 13 is changed by the shifting of the circular saw blade 11, thus seriously affecting its service life, and the position of the spring 19 has to be adjusted to strengthen its push force after used for a period of time, resulting in increasing trouble to a user.

SUMMARY OF THE INVENTION

The main objective of the invention is to offer a transmission device of a table saw, having a motor and an elevating plate fixed on a base, a first belt connected to a belt pulley at a front end of the motor and to a transfer member, and a second belt connected to the transfer member and to the belt pulley of a circular saw blade. Thus, the first belt and the second belt are activated to rotate and carry on transmission at fixed positions, accordingly improving the trouble of the conventional device that the belt will become loose or tight when the saw blade is moving up or down.

Another objective of the invention is to offer a transmission device of a table saw, capable to keep the tension of the belts unchanged whether the circular saw blade moves up or down so as to prolong the service life of belts.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
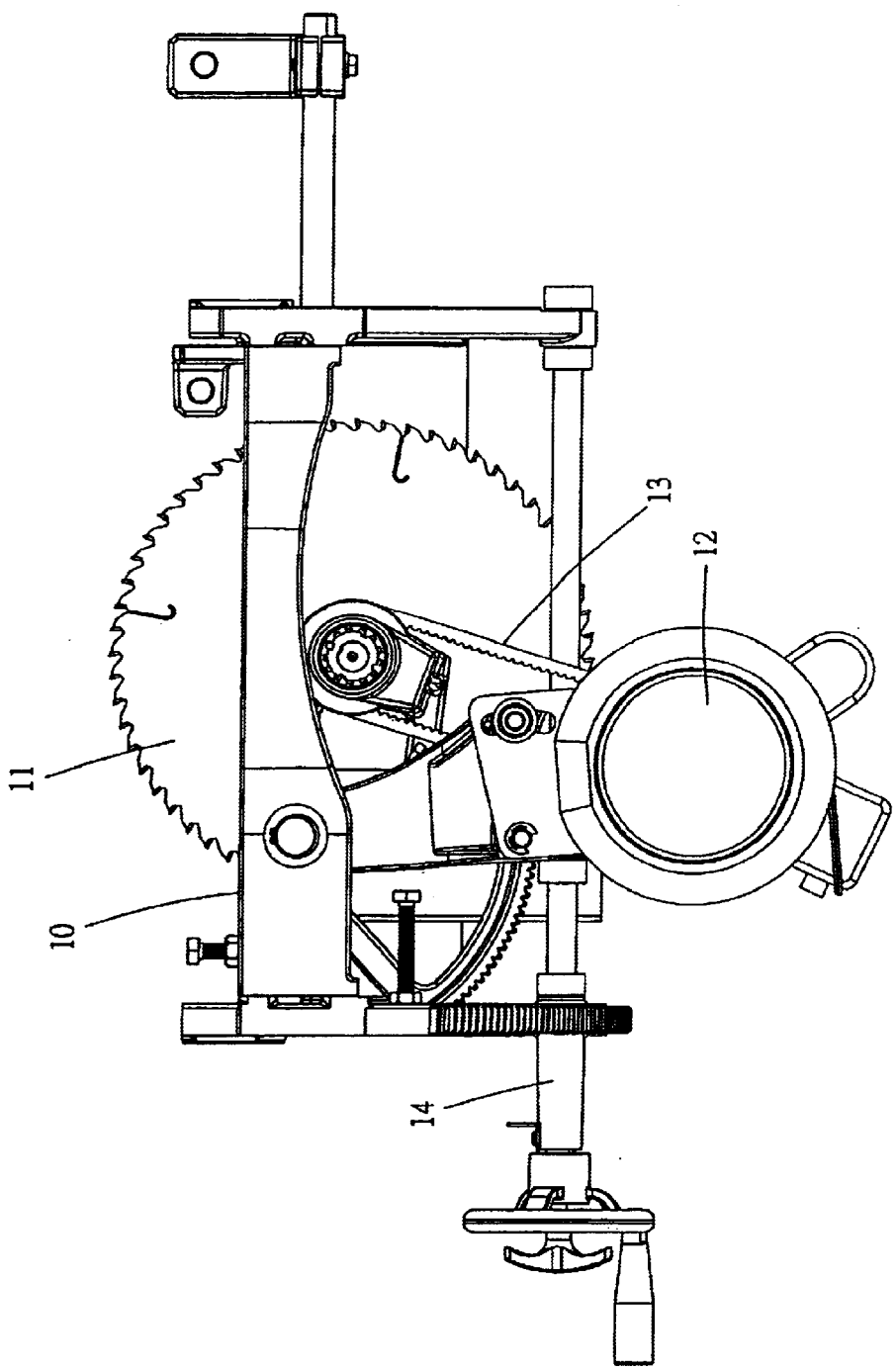
FIG. 1 is a cross-sectional view of a conventional table saw.
Figure 2:
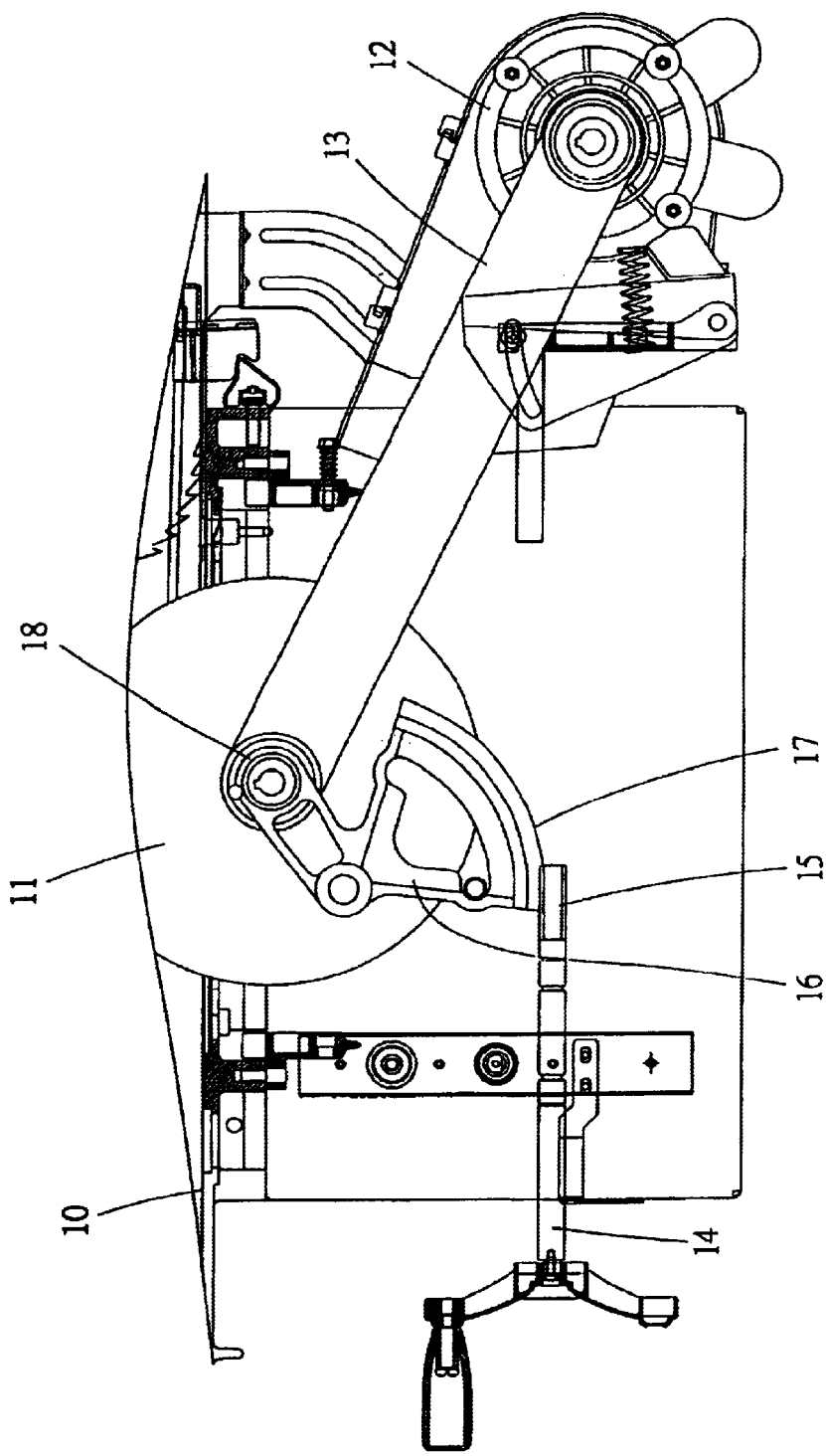
FIG. 2 is a cross-sectional view of the transmission device of the conventional table saw.
Figure 3:
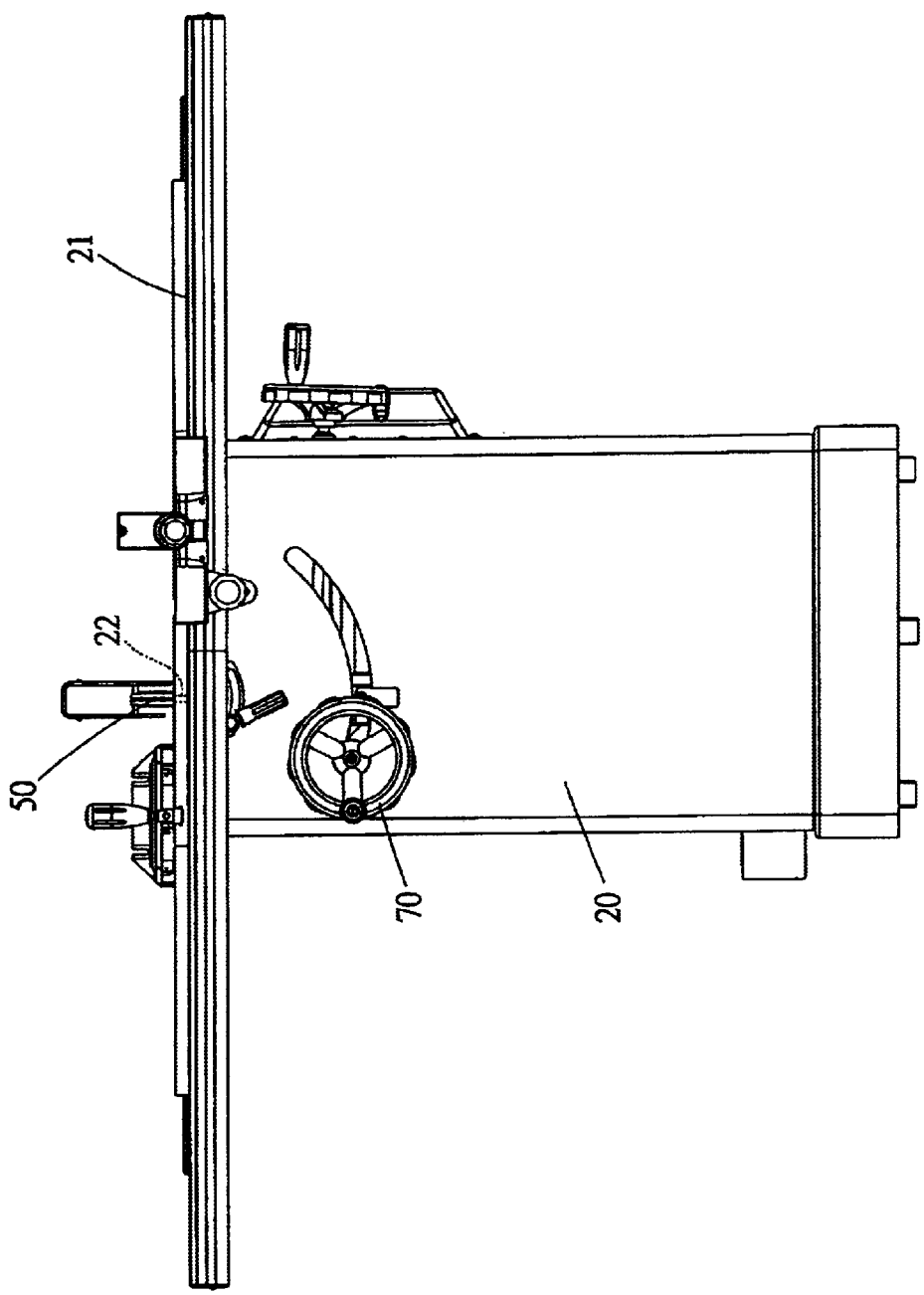
FIG. 3 is a cross-sectional view of a table saw with a transmission device in the present invention.

A preferred embodiment of a transmission device of a table saw in the present invention, as shown in FIG. 3, includes a box 20, a base 30, a motor 34, an elevating member 40, and an elevating handle 70 as main components combined together.

The box 20 is provided with a table 21 on top, and with a sawing slot 22 formed at a preset position in the center of the table 21.

Figure 4:
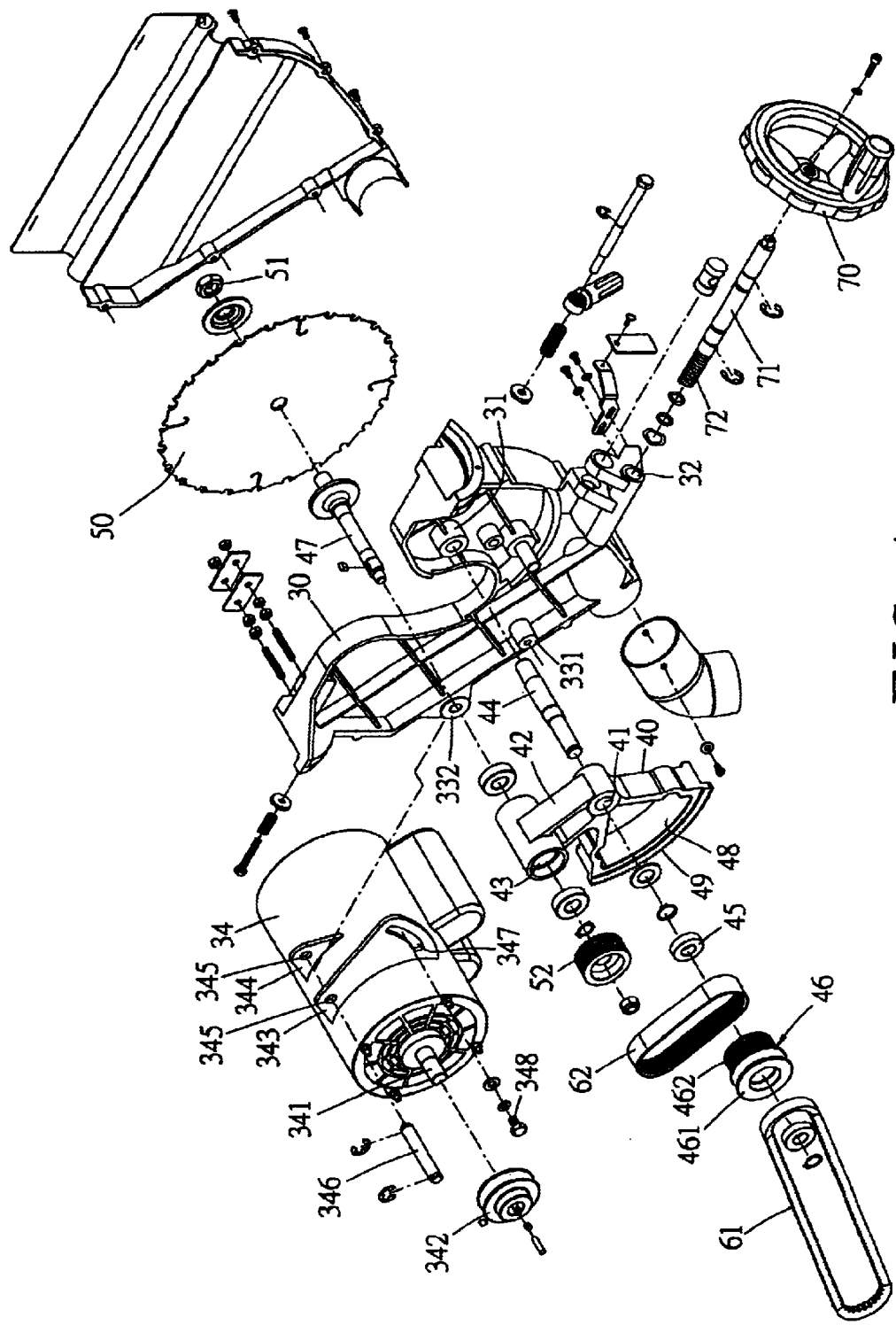
FIG. 4 is an exploded perspective view of the transmission device of the table saw in the present invention.
Figure 5:
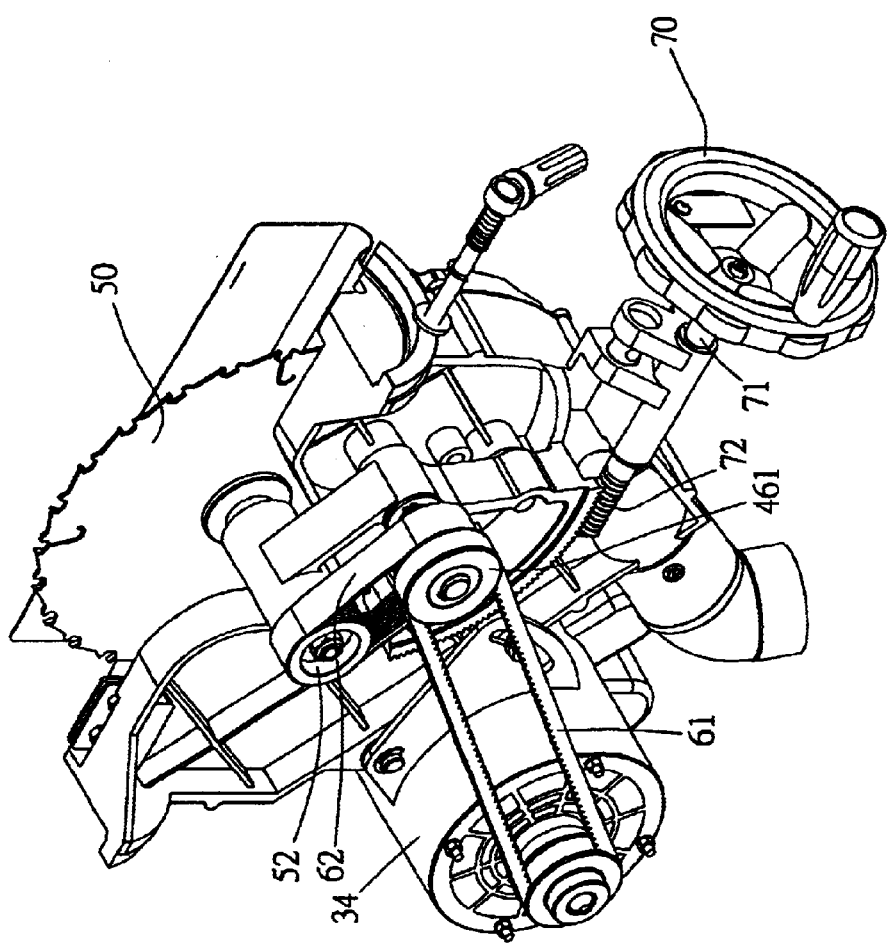
FIG. 5 is a perspective view of the transmission device of the table sawing-machine in the present invention.

The base 30, as shown in FIG. 4, is installed in the inner center of the box 20, having a shaft base 31 on a front upper side and a lateral hole 32 at a front lower side. The base 30 further has a front locking hole 331 and a rear locking hole 332 provided at its rear bottom.

The motor 34 has a shaft 341 fitted with a belt pulley 342 around a front end, and a front plate 343 and a rear plate 344 positioned in parallel on the top of its casing, respectively having a through hole 345 facing each other for a fixing shaft 346 to pass through and then to be fitted in the rear locking hole 332 of the base 30. Besides, the front plate 343 is provided with a curved slot 347 on a front end for a bolt 348 to insert therethrough and then to be locked in the front locking hole 331 of the machine base 30. Thus, the position of the motor 34 can be adjusted by shifting of the curved slot 347.

The elevating member 40 has a first shaft hole 41 in a center portion, a support arm 42 formed on top and a second shaft hole 43 formed on the end of the support arm 42. A first support shaft 44 has its left end passing through the first shaft hole 41 and its right end fixed on the shaft base 31. After the left end of the first support shaft 44 passes through the first shaft hole 41, it is fixedly fitted around with a bearing 45 and then fitted with a rotatable transfer member 46. The transfer member 46 is composed of a front belt pulley 461 and a rear belt pulley 462 formed integral.

Further, a second support shaft 47 has its right end fixed with a circular saw blade 50 with a nut 51 and its left end inserting through the second shaft hole 43 of the elevating member 40 and then fitted with a belt pulley 52. Then, a first belt 61 is connected around the belt pulley 342 on the front end of the motor 34 and around the front belt pulley 461 of the transfer member 46 so that the motive power generated by the motor 34 can be transmitted to the transfer member 46, and a second belt 62 is connected around the rear belt pulley 462 of the transfer member 46 and around the belt pulley 52 of the circular saw blade 50 so that the motive power is then transmitted to the circular saw blade 50.

In addition, the elevating member 40 is provided with an arc-shaped plate 48 having a section of gear teeth 49 formed along its curved bottom. And the circular saw blade 50 has its upper portion protruding out of the table 21 through the sawing slot 22 for cutting off wood materials.

The elevating handle 70 is connected in center with a rotating shaft 71 having a worm 72 member formed on a front end. After the rotating shaft 71 inserts through the lateral hole 32 of the machine base 30, its worm 72 will mesh with the gear teeth 49 under the arc-shaped plate 48 of the elevating member 40.

Next, the functions and advantages of the invention are specifically described below.

1. The motor 34 in this invention is installed on the machine base 30 and the motive power generated by the motor 34 is independently transmitted to the front belt pulley 461 of the transfer member 46. Besides, the transfer member 46 is located at a shaft position of rotating of the elevating member 40, therefore the first belt 61 of the motor 34 will maintain its original length, no matter how the elevating member 40 is rotating, accordingly eliminating the defect of a belt being pulled long and becoming loose in the conventional device described above.

2. The motive power is subsequently transmitted to the circular saw blade 50 by the rear belt pulley 462 of the transfer member 46, and, as the first shaft hole 41 and the second shaft hole 43 used for connecting the second belt 62 are fixedly formed at the opposite ends of the support arm 42, keeping the distance unchanged, therefore the second belt 62 will not be pulled long like that of the conventional device.

3. When the elevating handle 70 is turned around, the worm 72 of the rotating shaft 71 will rotate together with the gear teeth 49 under the elevating member 40 and the elevating member 40 supported by the first shaft 44 will also rotate to activate the second shaft hole 43, the second support shaft 47 and the circular saw blade 50 to move in an arcuate direction. Thus, the portion of the circular saw blade 50 protruding out of the sawing slot 22 can be of different heights suitable for cutting off wood materials of different thickness.

4. The motor 34 and the elevating member 40 are assembled on the machine base 30 and carry on transmission at fixed positions by means of the first belt 61, the transfer member 46 and the second belt 62. Besides, the elevating member 40 is based on the first support shaft 44, while the circular saw blade 50 is based on the second shaft 47 to change their moving directions, thus avoiding the trouble that the belt may be pulled loose when the elevating member 40 and the circular saw blade 50 are rotating and moving.

While the preferred embodiment of the invention has been described above, it will be recognized and understood that various modifications may be made therein and the appended claims are intended to cover all such modifications that may fall within the spirit and scope of the invention.

What is claimed is:

1. A transmission device of a table saw comprising: a box, a base, an elevating member, and a motor;

said box having a table on top, said table having a sawing slot formed at a preset position in a center and an upper portion of a circular saw blade protruding therethrough for cutting off wood materials;

said base installed in said box and provided with the motor in a preset position;

said elevating member having a first shaft hole and a second shaft hole spaced apart a preset distance, a first support shaft having a first end fixed on said base and a second end inserted through said first shaft hole and then pivotally fitted with a rotatable transfer member having a front and a rear belt pulley connected together, a second support shaft having a first end secured with said circular saw blade and a second end passing through said second shaft hole and pivotally fitted with a first belt pulley of said circular saw blade, then a first belt connected around a second belt pulley connected to a first end of said motor and around said front belt pulley of said transfer member, a second belt connected around said rear belt pulley of said transfer member and around the second belt pulley of said second support shaft, wherein said elevating member is provided with an arc-shaped plate at a lower portion having a gear along its curved bottom, and an elevating handle is connected in center with a rotating shaft formed with a worm on a front end to mesh with said gear under said elevating member.

2. A transmission device of a table saw comprising: a box, a base, an elevating member, and a motor;

said box having a table on top, said table having a sawing slot formed at a preset position in a center and an upper portion of a circular saw blade protruding therethrough for cutting off wood materials;

said base installed in said box and provided with the motor in a preset position;

said elevating member having a first shaft hole and a second shaft hole spaced apart a preset distance, a first support shaft having a first end fixed on said base and a second end inserted through said first shaft hole and then pivotally fitted with a rotatable transfer member having a front and a rear belt pulley connected together, a second support shaft having a first end secured with said circular saw blade and a second end passing through said second shaft hole and pivotally fitted with a first belt pulley of said circular saw blade, then a first belt connected around a second belt pulley connected to a first end of said motor and around said front belt pulley of said transfer member, a second belt connected around said rear belt pulley of said transfer member and around the second belt pulley of said second support shaft, wherein said base is provided with a front and a rear locking hole spaced apart at bottom side, and said motor has a front and a rear plate provided in parallel on the top of its casing and each said plate has a through hole facing each other for a fixing shaft to insert through and to be fitted in said rear locking hole of said machine base, said front plate having a curved slot formed at a front side for a bolt to insert through and then be fixed in said front locking hole of said machine base, thus the position of said motor capable to be adjusted by shifting of said curved slot.

* * * * *